United States Patent [19]
Nalley

[11] 3,739,159
[45] June 12, 1973

[54] GAS FLOW CALCULATION SYSTEM
[75] Inventor: Robert E. Nalley, Anaheim, Calif.
[73] Assignee: Hydrill Company, Los Angeles, Calif.
[22] Filed: Dec. 27, 1971
[21] Appl. No.: 212,279

[52] U.S. Cl............ 235/151.34, 73/194 E, 73/195, 73/205 R, 73/DIG.6, 235/92 MT, 235/150.5
[51] Int. Cl........ G06j 1/00, G06f 3/05, G06f 15/32
[58] Field of Search............ 73/194 E, 195, 205 R, 73/211, DIG. 6; 235/92 CP, 92 MT, 150.5, 151.34

[56] References Cited
UNITED STATES PATENTS
3,673,392  6/1972  Holm .............................. 235/150.2
3,313,160  4/1967  Goldman ......................... 73/195 X Primary Examiner—Malcolm A. Morrison
Assistant Examiner—R. Stephen Dildine, Jr.
Attorney—William W. Haefliger, H. Calvin White and Louis J. Bachand, Jr.

[57]  ABSTRACT

Gas flow calculation equipment to compute the quantity $\Delta P \cdot P/T$ in digital form includes:
  a. an ADC processing unit operable to receive analog signals P, $\Delta P$ and T and to provide digital outputs $\Delta P/T$ and P,
  b. a first shift register connected to receive said digital output $\Delta P/T$ and into which said digitized $\Delta P/T$ is shiftable,
  c. a second shift register connected to receive said digital output P and into which digitized P is shiftable,
  d. multiplier means connected to receive and multiply the contents of said shift registers, thereby producing a corresponding digital product, and
  e. a third shift register connected to receive the digital product of the multiplier means. Additional circuitry is operable to derive, from the contents of the third register, the square root of the quantity $\Delta P \cdot P/T$.

11 Claims, 5 Drawing Figures

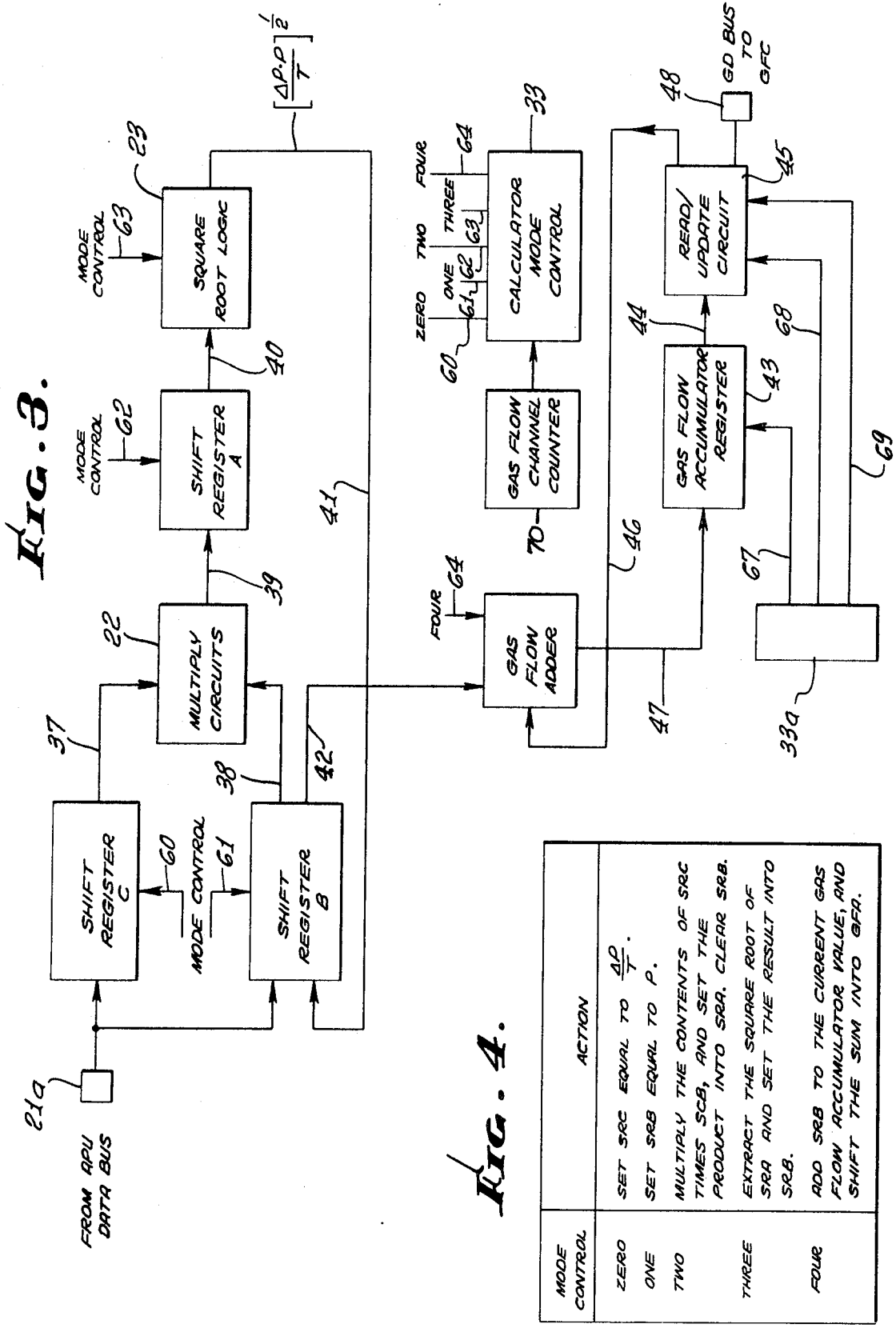

GAS FLOW CALCULATION SYSTEM

BACKGROUND OF THE INVENTION

This invention relates generally to gas flow measurement, and more particularly concerns the processing into digital form of analog data derived from a gas pipe line for the purpose of deriving gas flow rate data in digital form.

When crude oil from a producing well is lifted or otherwise delivered to the surface, it releases natural gas. This gas is normally collected and payment must be made to the lessor for all gas removed from his property, necessitating accurate measurement of gas flow. When a well is artificially pressurized by introducing natural gas from an external source to cause the crude oil to rise to the surface, it also becomes necessary to accurately measure the gas flow for control purposes.

Total net flow is determined by measuring the absolute pressure P of the gas in a pipeline, the differential pressure $\Delta P$ or pressure drop across an orifice in the line, and the gas temperature T in the line. The flow rate is proportional to $(\Delta P/T \times P)^{1/2}$ which, when multiplied by a known constant, corrects to standard cubic feet per unit of time. If the sampling rate is known, then the flow rate can be integrated to derive total net flow of gas in standard cubic feet over a given time span.

In actual practice, it is possible to transmit the $\Delta P$, P and T data from each of a large number (say, hundreds) of measurement locations or stations to a central computer for computation of the net flow or total flow. For this purpose, the data would be transmitted to the computer in sequence from the many different stations during sampling intervals. It is found that the data bandwidth requirements for a computer-based system becomes very large for the high sampling rates needed for accuracy where data from hundreds of stations is sampled, necessitating a large, expensive central computer installation.

In that certain Wayne E. Holm application for U.S. Letters Patent, Ser. No. 7,818, entitled, REMOTE TERMINAL COMPUTING UNIT FOR USE WITH CENTRAL COMPUTER, now U. S. Pat. No. 3,673,392, apparatus is disclosed for deriving gas flow rate data. It is an object of the present invention to provide improved, more accurate equipment for deriving gas flow rate data, while using certain of the principles disclosed in that application. Other objects and advantages of the invention will appear from the following description.

SUMMARY OF THE INVENTION

Basically, the invention is embodied in equipment operable to compute values for the quantity ($\Delta P \times P/T$), and the square root of that quantity, such equipment including, in combination, a. an analog to digital processor,
b. multiplexer means to selectively route analog signals representing $\Delta P$, P and T to the processor during at least two different time intervals for conversion by the processor into one digital output representative of the quotient of one of the $\Delta P$ and P signals and said T signal, and into another digital output representative of the other of said $\Delta P$ and P signals, and
c. shift register means in which said digital outputs are stored, said register means connected with said processor.

As will be seen, multiplier circuitry is connected with the registers to receive and multiply the digital outputs stored in the registers, and thereby produce digital output values for ($\Delta P \cdot P/T$), from which values for $[\Delta P \cdot P/T]^{1/2}$ may be derived by square root circuitry. As a result, the computations to derive ($\Delta P \cdot P/T$) and $[\Delta P \cdot P/T]^{1/2}$ need not be performed in the analog processor, and increased accuracy results from digital computation.

More specifically, the shift registers may include a first register connected to receive from the analog to digital processor digital output values for $\Delta P/T$, and a second register connected to receive from the processor digital valves for P, these values being received during different time intervals. Further, a third shift register may be provided to receive the digital output of the multiplier circuitry which operates to receive and multiply digital values for $\Delta P/T$ and P derived from the first and second registers.

As will be seen one of the first two registers may be employed to temporarily store digital values for $[\Delta P \cdot P/T]^{1/2}$ derived by square root circuitry connected with the third register. These square root values are added to previously accumulated square root (flow rate) values, and stored in an accumulator, for derivation (by integration) of total net flow of gas in standard cubic feet over a given time span. Such net flow values may then be transmitted to a central computer, as will be seen.

These and other objects and advantages of the invention, as well as the details of an illustrative embodiment, will be more fully understood from the following description and drawings, in which:

DRAWING DESCRIPTION

FIG. 1 is a system block diagram;
FIG. 2 is a block diagram showing a remote terminal unit analog processor;
FIG. 3 is a block diagram showing remote terminal unit gas flow calculating and accumulating equipment;
FIG. 4 is a table; and
FIG. 5 is a more specific system diagram.

DETAILED DESCRIPTION

Figure 1:
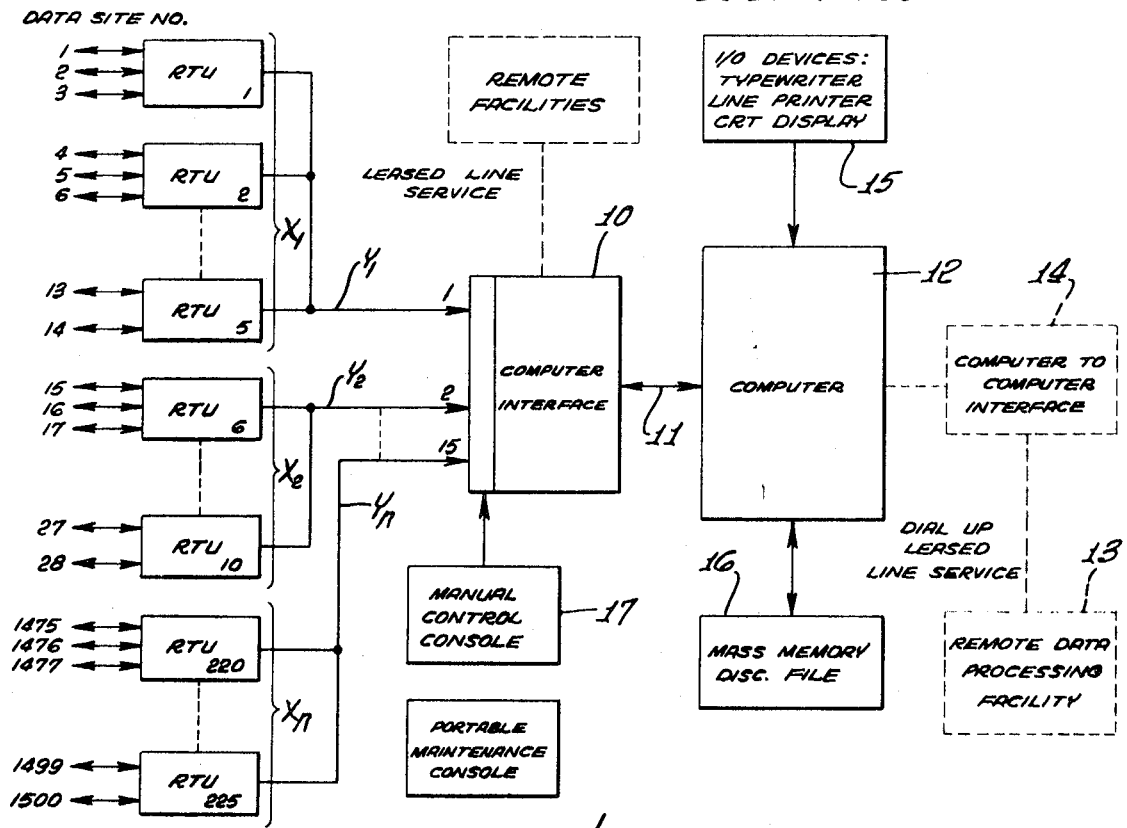

Referring first to FIG. 1, a first series of remote terminal units (RTUs) is indicated at $X_1$ as connected with a party line $Y_1$; another series of RTUs is indicated at $X_2$ as connected with party line $Y_2$; and a third series of RTUs $X_n$ is connected with party line $Y_n$. The party lines are also connected with a computer interface unit 10 which is connected at 11 with the computer 12, the latter being connectible if desired to the remote data processing facility 13 via interface 14. Input/output devices 15 and disc file 16 are connected with computer 12; and manual control console 17 is connected with the unit 10. It will be understood that the computer 12 scans the RTUs (and specifically the data storage units thereof) on a repetitive basis.

Each RTU operates as a computing unit, and may for example have three signal inputs A, B and C and an output which is a function of A, B and C, expressed as follows:

$$\text{RTU output} = f(A, B, C)$$

(Eq. 1)

More specifically, the RTUs to be described incorporate analog to digital converters, shift registers, multipliers and square root logic utilized during different time intervals to perform different calculations. The output of the RTU may be expressed as follows:

$$\text{Output} = (B/A \times C)^{1/2}$$

(Eq. 2)

As will be brought out, such preprocessing of the data at a remote location near transducers which generate the signals $A$, $B$ and $C$, results in a much lower bandwidth requirement as respects data transmission to the central computer, as compared with a system wherein each of $A$, $B$ and $C$ is transmitted to the computer. Also, a much smaller central computer may then be utilized.

Figure 2:
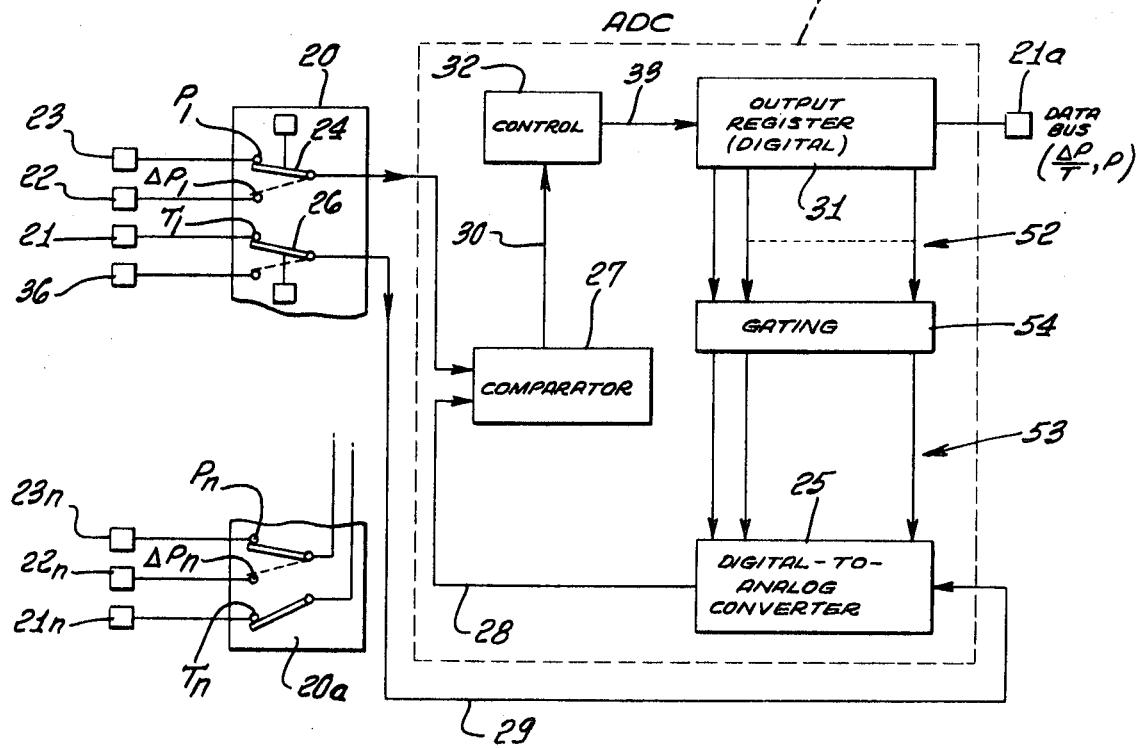

Extending the description to FIGS. 2 and 3, the RTU illustrated has an input for a variable A (as for example input terminal $T_1$ for signal voltage representative of temperature $T_1$ as sensed by a transducer 21). The RTU also has an input for a variable B (as for example input terminal $\Delta P_1$ for signal voltage representative of a gas pressure difference as measured across an orifice in a gas flow line by transducer 22). Other pressure differences $\Delta P_2$ and $\Delta P_3$ may also be measured. Finally, the RTU has an input for a variable C (as for example input terminal P for signal voltage representative of gas line pressure P as measured near the orifice, by a transducer 23).

In this regard, total net flow Q is determined by first measuring the absolute pressure P of the flow in a line; the differential pressure $\Delta P$ across an orifice in the line; and the temperature T. The gas flow rate is proportional to $(\Delta P/T \times P)^{1/2}$, and the latter when multiplied by a suitable constant yields the flow in standard cubic feet per unit of time. If the sampling rate is known, then the flow rate can be integrated to produce a total net flow in standard cubic feet over a given time span.

Viewed in a broader sense the RTU equipment seen in FIGS. 2 and 3 may be considered to include:
 a. an analog to digital processor such as the ADC 19,
 b. multiplexer means (such as 20, for example) to selectively route analog signals representing $\Delta P$, P and T to the processor during at least two different time intervals for conversion by the processor into one digital output representative of the quotient of one of the $\Delta P$ and P signals and the T signal, and into another digital output representative of the other of the $\Delta P$ and P signals,
 c. shift register means (as for example the shift registers SRC and SRB in FIG. 3) into which the digital outputs of the ADC are transferred over data bus 21a for storage,
 d. multiplier circuitry 22 connected with the register means to receive and multiply the digital outputs and thereby produce digital product values ($\Delta P \cdot P/T$), and
 e. other circuitry, such as square root logic 23 operatively connected with the multiplier means, as via shift register A, to receive the product values and to compute digital values $[\Delta P \cdot P/T]^{1/2}$.

As a result, the multiplication and square root computation function may be performed by calculation equipment independently of operation of the ADC 19, instead of within the latter as in said Holm application, for increased speed and accuracy. In the above, and as explained in said Holm application, advantage is taken of the fact that an ADC is basically a divider (see also "Operational Amplifiers, Design and Application," by Graeme, Tobey and Huelsman, McGraw Hill Book Company, 1971) and that gas pressure in a nonvacuum system such as a pipeline will always exceed or be equal to zero.

During a first time interval $t_1$ of sampling of a given lease gasline, as seen in FIG. 2, the analog voltage (or current) representing differential pressure $\Delta P_1$ is routed by multiplexer 20 to the ADC input, as via switch arm 24, the multiplexer including a sample and hold amplifier as may be desired. Comparator 27 receives that input, as well as the output of the DAC 25 via line 28, the reference input to the DAC being the temperature $T_1$ via switch arm 26 and line 29. As a result, the comparator output at 30 fed to output register 31 via control 32 and control output 33 causes a digital value representing $\Delta P_{1/T1}$ to appear in the register 31, for immediate transfer to shift register C, seen in FIG. 3. See also Mode Control ZERO in the FIG. 4 table, and produced by control 33 in FIG. 3. The digital value stored in register 31 is transmitted at 52 and 53 via gating 54 to the DAC 25, to complete the loop in the ADC.

It will be further noted in FIG. 2 that the multiplexer may be extended at 20a to handle additional analog input channels indicated at $21_n$–$23_n$, connected with input terminals $T_n$, $\Delta P_n$ and $P_n$.

During a second time interval $t_2$, the analog voltage representing pressure $P_1$ is supplied to the ADC via channel 23 to the multiplexer 20, channels 21 and 22 being interrupted. A reference voltage channel 36 is connected via the multiplexer with the ADC reference input via line 29 to the DAC. This causes a digital value representing $P_1$ to appear in previously cleared register 31 for immediate transfer to shift register B, seen in FIG. 3. See Mode Control ONE in the FIG. 4 Table, and produced by the control 33.

Subsequently, during Mode Control state TWO, the contents of the shift registers C and B are transferred via lines 37 and 38 to the multiplier means 22, the product of the multiplication of these digital values being transferred via line 39 to shift register A.

Thereafter, during Mode Control state THREE, the contents of shift register A are transferred via line 40 to square root logic 23 wherein the square root is computed, the result being transferred via route 41 to shift register B, replacing its previous contents, $P_1$. One known method for square root extraction is the digit pairs, non-restoring process as outlined in, "The Logic of Computer Arithmetic" by Flores, pp 412–417. During the mode control state FOUR, the square root value stored in shift register B is transferred via line 42 to the gas flow ADDER, for addition to the previously entered contents of accumulator register 43 transferred therefrom via path 44, read/update circuit 45 and return path 46, the updated addition result or sum then being transferred via path 47 to the accumulator register 43. Thereafter, the updated contents of accumulator 43 (representing gas quantity or volume passing through a line over a given time, i.e. since the accumulator was last cleared) may be periodically read out via circuit 45 and bus 48, for transfer to the central computer 12.

More specifically the calculated gas volume may be held in the accumulator 43 until either READ AND CLEAR request is transmitted to the accumulator 43 and circuitry 45 as from control 33a via paths 67 and 68, or an UPDATE signal is transmitted to circuitry 45 via path 69.

In the foregoing, the mode control states TWO, THREE and FOUR may operate off-line from the ADC, as compared with mode control states ZERO and ONE associated with on-line time intervals $t_1$ and $t_2$, respectively. Connections associated with states ZERO—FOUR are indicated at 60, 61, 62, 63 and 64. States ZERO to FOUR may have associated time intervals.

Figure 5:
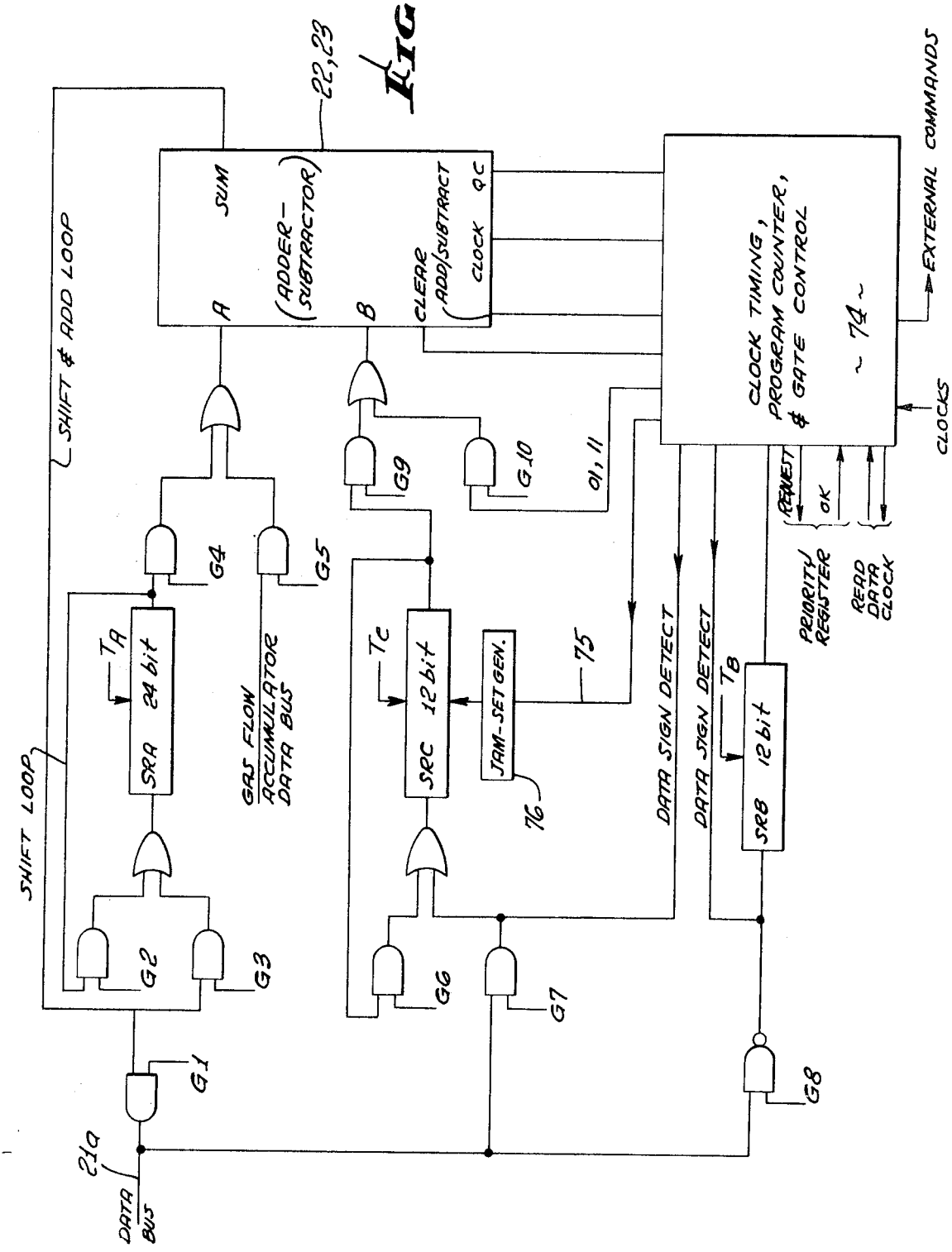

In the more complete example of the systems seen in FIG. 5, which is merely representative, the registers SRA, SRB and SRC remain the same, SRA producing a 24 bit product, SRC providing a 12 bit multiplicand representing $\Delta P/T$, and SRB providing a 12 bit multiplier representing P. Input data on bus 21a is clocked into SRC and SRB via gates G7 and G8, respectively. During the multiply mode (MODE CONTROL TWO, above), gates G1, G5, G7, G8 and G10 will be unconditionally closed (i.e. state zero); gates G4, G6 and G9 will be open; and gate G2 and G3 will be conditioned by the output of the multiplier register SRB. Multiplication commences from the least significant bit of the amplifier.

During the multiply operation, 24 clock pulses transmitted to the clock of SRA, via path $T_A$, determine an add-or-shift subcycle. Twelve clock pulses, of the same rate and synchronous to $T_A$, shift the multiplicand register SRC, and are transmitted via input path $T_C$. The start of this 12 pulse train is delayed one count each subcycle, and this will accomplish the actual shift. The multiplier register SRB is advanced once each subcycle, via path $T_B$. For each subcycle, the add or shift is controlled by G2 (shift or not add) and by G3 (add). These gate levels are in turn determined by the output of SRB. On the last subcycle, gate G6 is at zero state, so that SRC is cleared in preparation for the square root operation. The block designated adder-subtractor corresponds to blocks 22 and 23 in FIG. 3.

After 288 (i.e. 12 × 24) clock times, the multiplication should be accomplished. At a clock rate of 1.2288 mc, the multiply operation should take 245 usec. The product will be in SRA in the bit configuration required for the operand of the square root process.

As previously noted, the method of square root extraction is known as the digit pairs, non-restoring scheme outlined in Flores, "The Logic of Computer Arithmetic", pp 412–417. Only two registers are required, SRA to contain the operand and modified operand, and SRC to contain the accumulative result. On the initial cycle, 01 (as provided by the timing and control logic 74) is subtracted from the most significant bit-pair of the operand. The overflow, or sign bit is observed at $Q_C$ in the adder-subtractor (22, 23) (1 = neg, 0 = plus). If "zero", jam a "one" in the most significant bit of SRC (as via path 75 and jam set generator 76), and prepare to subtract 01 from the second most significant bit pair in SRA. If "one", leave the most significant bit in SRC at "zero", and prepare to add 11 to the second most significant bit pair of SRA.

On successive cycles, the procedure continues as far as adding the 11 or subtracting the 01 in the next least significant bit pairs, additionally adding or subtracting the accumulative result in SRC. The most significant bit of SRC shifts to the right once in respect to SRA, with each cycle. This may be accomplished by delaying $T_C$ one position each cycle, keeping the bit significance in SRC stationary, but requiring the data jam setting to move to the right, once each cycle. After completion, advance to UPDATE mode. In the latter, $T_B$ should be controlled to assure that the contents of SRC are added to the least significant bits at the word from the gas flow accumulator register.

I claim:

1. In gas flow calculation equipment to compute the quantity $\Delta P \cdot P/T \ [(P \cdot P/T)^{1/2}]$, the combination comprising
   a. an ADC processing unit operable to receive analog signals P, $\Delta P$ and T and to provide digital outputs $\Delta P/T$ and P,
   b. a first shift register connected to receive said digital output $\Delta P/T$ and into which said digitized $\Delta P/T$ is shiftable,
   c. a second shift register connected to receive said digital output P and into which digitized p is shiftable,
   d. multiplier means connected to receive and multiply the contents of said shift registers, thereby producing a corresponding digital product, and
   e. a third shift register connected to receive the digital product of the multiplier means.

2. The combination of claim 1 including logic means connected to receive the contents of the third shift register and to compute therefrom a square root output.

3. The combination of claim 2 including circuitry to supply the square root output of the logic means to one of the first and second shift registers, for temporary storage, said square root output representing gas flow.

4. The combination of claim 3 including an accumulator register connected via a data bus with said one of the first and second shift registers for transmission to the accumulator of data repersentative of the sum of the previously stored contents of the accumulator and said square root output stored in said one register.

5. The combination of claim 2 including control means connected with said first and second registers to effect setting of the first register to receive said digital output $\Delta P/T$, during a first time interval, and to effect setting of the second shift register to receive said digital output P during a second time interval.

6. The combination of claim 5 wherein said control means is connected with the third shift register to effect setting thereof to receive the product of the multiplied contents of the first and second registers, during a third time interval.

7. The combination of claim 6 wherein said control means is connected with said logic means to effect setting thereof to receive the product contents of the third register and to compute said square root output, during a fourth time interval.

8. The combination of claim 7 including circuitry to supply the square root output of the logic means to one of the first and second shift registers, for temporary storage, said square root output representing gas flow, said one register being cleared by said control means after said third register receives the multiplied contents of the first and second register, said control means effecting supply of said square root output to said one register after said clearing thereof.

9. The combination of claim 8 including an accumulator register connected via a data bus with said one of the first and second registers for transmission to the accumulator, during a fourth time interval under the influence of said control means, of data representative of the sum of the previously stored contents of the accumulator and said square root output stored in said one register.

10. In gas flow calculation equipment operable to compute the quantity $\Delta P \cdot P/T$), the combination comprising
   a. an analog to digital processor,
   b. multiplexer means to selectively route analog signals representing $\Delta P$, P and T to the processor during at least two different time intervals for conversion by the processor into one digital output representative of the quotient of one of the $\Delta P$ and P signals and said T signal, and into another digital output representative of the other of said $\Delta P$ and P signals,
   c. shift register means in which said digital outputs are stored, said register means connected with said processor, and
   d. multiplier circuitry connected with said register means to receive and multiply the digital outputs stored in said register means, and thereby produce digital product values ($\Delta P \cdot P/T$).

11. The combination of claim 10 including other circuitry connected with said multiplier circuitry to receive said digital produce values and to compute values for $(\Delta P \cdot P/T)^{1/2}$.

* * * * *

UNITED STATES PATENT OFFICE
CERTIFICATE OF CORRECTION

Patent No.     3,739,159            Dated June 12, 1973

Inventor(s)    Robert E. Nalley

It is certified that error appears in the above-identified patent and that said Letters Patent are hereby corrected as shown below:

On summary page at [73] after Assignee: "Hydrill" should read -- Hydril --

Column 6, line 11; "quantity $\Delta P.P/T) [(P.P/T)^{1/2}]$, the combination com- " should read --quantity $\Delta P.P/T$ , the combination com- --

Column 7, line 7; "compute the quantity $\Delta P.P/T)$, the combination com- " should read --compute the quantity $\Delta P.P/T$ , the combination com- --

Signed and sealed this 30th day of April 1974.

(SEAL)
Attest:

EDWARD M.FLETCHER,JR.
Attesting Officer

C. MARSHALL DANN
Commissioner of Patents